United States Patent [19]

Seguin

[11] Patent Number: 5,029,173
[45] Date of Patent: Jul. 2, 1991

[54] LASER SYSTEM WITH MULTIPLE RADIAL DISCHARGE CHANNELS

[76] Inventor: Herb J. J. Seguin, 12639 - 52 Avenue, Edmonton, Alberta, Canada

[21] Appl. No.: 495,606

[22] Filed: Mar. 19, 1990

[51] Int. Cl.$^5$ ............................................. H01S 3/10
[52] U.S. Cl. ....................................... 372/23; 372/95; 372/87
[58] Field of Search ................... 372/61, 95, 92, 93, 372/97, 34, 33, 85, 81, 82, 55, 69, 76

[56] References Cited

U.S. PATENT DOCUMENTS

| | | | |
|---|---|---|---|
| 4,438,514 | 3/1984 | Chenausky et al. | 372/97 |
| 4,606,030 | 8/1986 | Berkowitz et al. | 372/23 |
| 4,677,636 | 6/1987 | Laudenslager et al. | 372/81 |
| 4,796,272 | 1/1989 | Klingel | 372/61 |
| 4,802,183 | 1/1989 | Harris et al. | 372/82 |
| 4,807,232 | 2/1989 | Hart et al. | 372/82 |
| 4,813,052 | 3/1989 | DeMaria et al. | 372/61 |
| 4,891,819 | 1/1990 | Sutter, Jr. et al. | 372/82 |

*Primary Examiner*—Léon Scott, Jr.
*Attorney, Agent, or Firm*—Anthony R. Lambert

[57] ABSTRACT

A laser system includes three or more narrow-gap laser discharge channels mounted radially about a common axis. The laser discharge volumes may be excited by RF radiation, microwave radiation or by means of the MAGPIE system. The laser discharge channels may be mounted in an optical resonator having a common unstable cavity mode, a toric resonator, with or without feedback, or a retro-reflected toric unstable resonator. A pair of adjacent discharge channels may be coupled to form a ring microwave resonator, and the ring resonator may be formed by a continuous double ridged waveguide. Excitation for the continuous double ridged waveguide is optimally produced by a magnetron.

15 Claims, 10 Drawing Sheets

LASER SYSTEM WITH MULTIPLE RADIAL DISCHARGE CHANNELS

FIELD OF INVENTION

This invention relates to high powered laser systems, and in particular to multi-channelled laser systems.

BACKGROUND OF THE INVENTION

High average power CW or pulsed carbon dioxide lasers, of the type useful in any meaningful materials processing application, have historically featured large volume discharges, cooled by massive forced convection. As a consequence, such lasers have invariably been characterized by a large physical size, incorporating a relatively complicated gas transport and heat-exchange system.

Due to the many and rapidly moving parts inherent in their design, these large machines have not only been costly to build and install, but in addition require considerable peripheral equipment, and frequent supervision to achieve proper operation. Because of these factors, they have proven to be unsuitable for a number of applications where mobility, weight, or freedom from service and operator intervention are prime considerations.

Thus, despite a number of impressive laser developments reported in the trade literature, it has become well recognized that to achieve widespread adoption of lasers for the processing of materials it will be necessary to develop more compact high powered laser systems, which are capable of prolonged operation in an industrial environment, without the need for frequent adjustment or maintenance.

The above is particularly true in robotic applications for flexible manufacturing, where portability is an additional constraint.

Being cognizant of this fact, a number of researchers have recently devoted considerable effort into the development of new laser geometries which conceivably could address this problem. In particular, research work on diffusion cooled R.F. excited lasers, of both waveguide and strip-line or slab geometries, has demonstrated that useful power levels can be achieved from very small packages, without any form of gas transport.

Anticipated further advances in this particular art should raise the attainable power into the many hundreds of watt category, and perhaps even near the 1 kilowatt level. However, direct scaling of the approach into the MULTIKILOWATT range, as is desirable in many industrial situations, presents considerable difficulty.

Because of this fact, increasing attention is being focused on multiple beam systems, constructed with a number of identical waveguide discharge channels, optically coupled either individually or by a common resonator.

When the individual lasers in such a system operate independently their output radiation is non-phase coherent. Consequently, the diffraction limit and focusability of the resultant beam does not benefit from the increased aperture of the assembly. Fortunately, coherent phase-locking of the individual gain sections has been demonstrated to provide a viable solution to this important problem.

The approaches thus far developed have been appropriate to parallel waveguide or tubular discharge sections, but not to slab gain geometries. The object of this patent application is therefore to teach the construction of a multi-channel parallel-slot excitation and optical extraction geometry. The device has no moving parts and appears scalable well into the multikilowatt range, in a very small physical package. The basic technique is also applicable to a number of gas discharge excitation processes utilizing different energy sources.

SUMMARY OF THE INVENTION

Thus in one embodiment, the invention provides a laser system comprising:
  plural pairs of parallel electrode faces, each pair of parallel electrode faces defining a narrow-gap discharge channel;
  the pairs of parallel electrode faces being arranged about and extending radially from a first common central axis;
  means attached to the electrode faces for diffusion cooling the electrode faces;
  means attached to the electrode faces for providing laser excitation energy to the electrode faces, whereby application of the laser excitation energy to the electrode faces generates a laser plasma in the discharge channels; and
  optical extraction means having a second central axis coinciding with the first common central axis and being disposed about the pairs of parallel electrode faces for generating a common resonator mode for all of the discharge channels and for extracting the laser energy from all of the discharge channels simultaneously.

In a still further embodiment of the laser system, the means for extracting the laser energy includes an optical resonator having a common unstable cavity mode and an annular output, and further includes an output compacting axicon mounted to receive the annular output.

In a still further embodiment of the laser system, the discharge channels are mounted in a retro-reflective toric unsatable resonator, and may include means mounted in the outfrom the laser system for feeding back a portion of the output into the discharge channels.

In a still further embodiment of the laser system, at least one pair of adjacent discharge channels is coupled to form a ring resonator, and may itself be formed by a continuous double ridged waveguide and be excited by a plurality of microwave generators.

In a preferred embodiment of the laser system, the electrodes are connected alternately to one end electrode plate at one end of the laser system, and another at the other end.

In a further preferred embodiment of the laser system, each pair of parallel electrode faces consists of a first electrode face from a first electrode and a second electrode face from a second electrode, each of the first and second electrodes being triangular in cross-section, and in this embodiment may have the number of plural pairs of parallel electrode faces an even number and each triangular electrode defining the electrode faces for two adjacent discharge channels, one on each side of the triangular electrode.

In a still further embodiment of the laser system, there is provided a laser system comprising:
  a first continuous ridged electrode defining a first ridge and forming a first ring, the fist ridge being formed on the inside of the first ring;

a second continuous ridged electrode defining a second ridge and forming a second ring inside the first ring, the second ridge opposing the first ridge;

the first and second ridges defining a narrow-gap discharge channel between them and the first and second electrodes thereby forming a continuous double ridged waveguide;

means connected to the first and second electrodes for pumping microwave laser excitation energy into the discharge channel and for generating a laser plasma in the discharge channel; and optical extraction means for extracting laser optical energy from the narrow-gap discharge channel.

In another aspect of this latter embodiment, the electrodes are metallic and diffusion cooled.

Further summary of the invention may be found in the claims.

BRIEF DESCRIPTION OF THE FIGURE

There will now be described preferred embodiments of the invention, with reference to the figures by way of example, in which figures like references denote like features, and in which.

DESCRIPTION OF THE PREFERRED EMBODIMENTS

Figure 1:
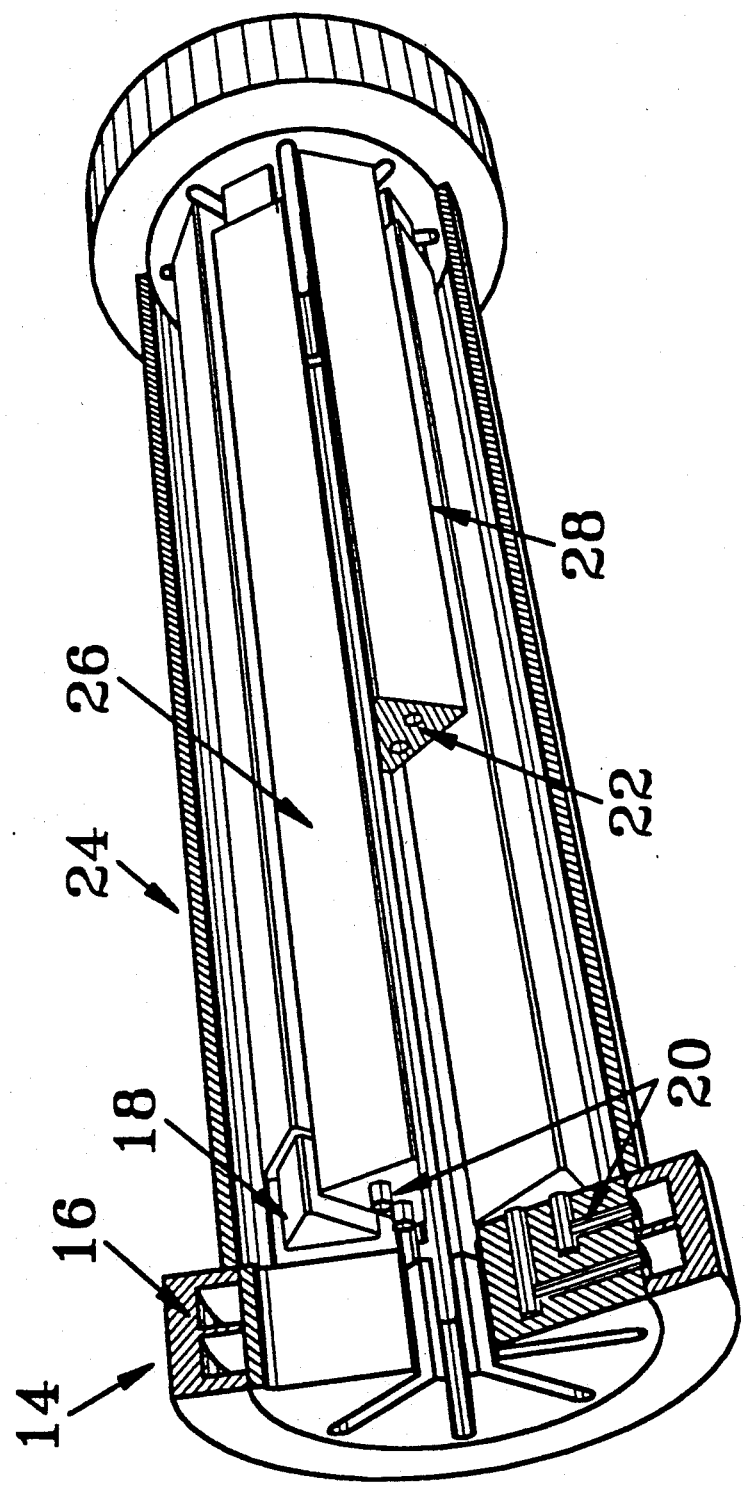
FIG. 1 is a perspective, partly cut away, of the basic multi-channel laser discharge geometry.

The basic multi-channel slot gain laser module configuration under discussion here is illustrated in FIG. 1. In essence the device is comprised of a number of parallel, narrow-gap, diffusion cooled, discharge channels mounted in a radial manner, similar to the Zodiac symbol. Although the prototype device of FIG. 1 was built with 8 parallel-slot gain sections, a much larger number can be used to further increase the power level from the device. The maximum number of parallel gain slots permissible in any given device is determined by the width of the individual slots and the overall diameter selected for the complete module. As used here and in the claims, parallel refers to the geometric relation between adjacent electrodes forming the boundary of the laser discharge channel. Also, as used here and in the claims, narrow-gap, when used in reference to a discharge channel, refers to a channel having a perpendicular width substantially less than its transverse width and its axial length, such that a stable laser plasma may be formed in the discharge channel. In the case of a very large electrode-length to discharge-gap ratio, such as 100 or more, the laser beam within each individual gain slot would propagate in an optical-waveguide mode.

A further increase in available output power can be obtained by connecting a number of identical gain modules in series. In this manner it is believed that a laser of about 5 kW output power can be obtained in a device having overall dimensions of about 15 cm in diameter and 2 meters long.

Referring to FIG. 1, the construction of the laser geometry can be clearly seen. The lasing region is a series of radially disposed parallel slots defined by the faces of electrodes 24. These electrodes may be made, for example, out of aluminum (possibly nickel plated), and their construction is well known in the art. The electrodes 24 are mounted in an electrode mounting end plate 16, one at each end of the electrodes. The electrodes 24 are enclosed within a hermetic enclosure 26. The excited slot-gain regions 28 extend between electrodes 24 and have exit regions machined within the electrode mounting end plate 16. Means for cooling of the electrodes 24 and end plate 16 is provided by the water cooling ring 14 and the interior water cooling tubes 22. Alignment of the electrodes is provided by alignment tubes 20, as well known in the art.

The laser plasma forms in the excited slot gain regions (or discharge channels) 28 and optical energy may be extracted from the laser by any of several optical extraction methods. Particular extraction methods having specific utility here are described later with reference to FIGS. 5, 6, 7 and 8.

Figure 2:
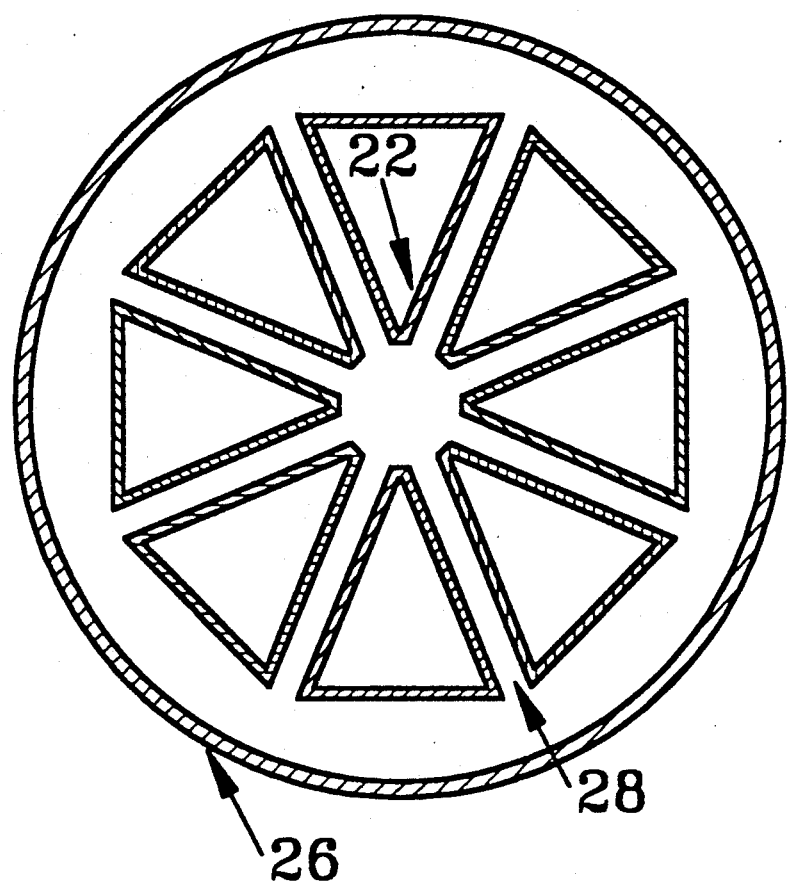
FIG. 2 is a cross-sectional schematic of an RF excited $CO_2$ laser with radial geometry.
Figure 3:
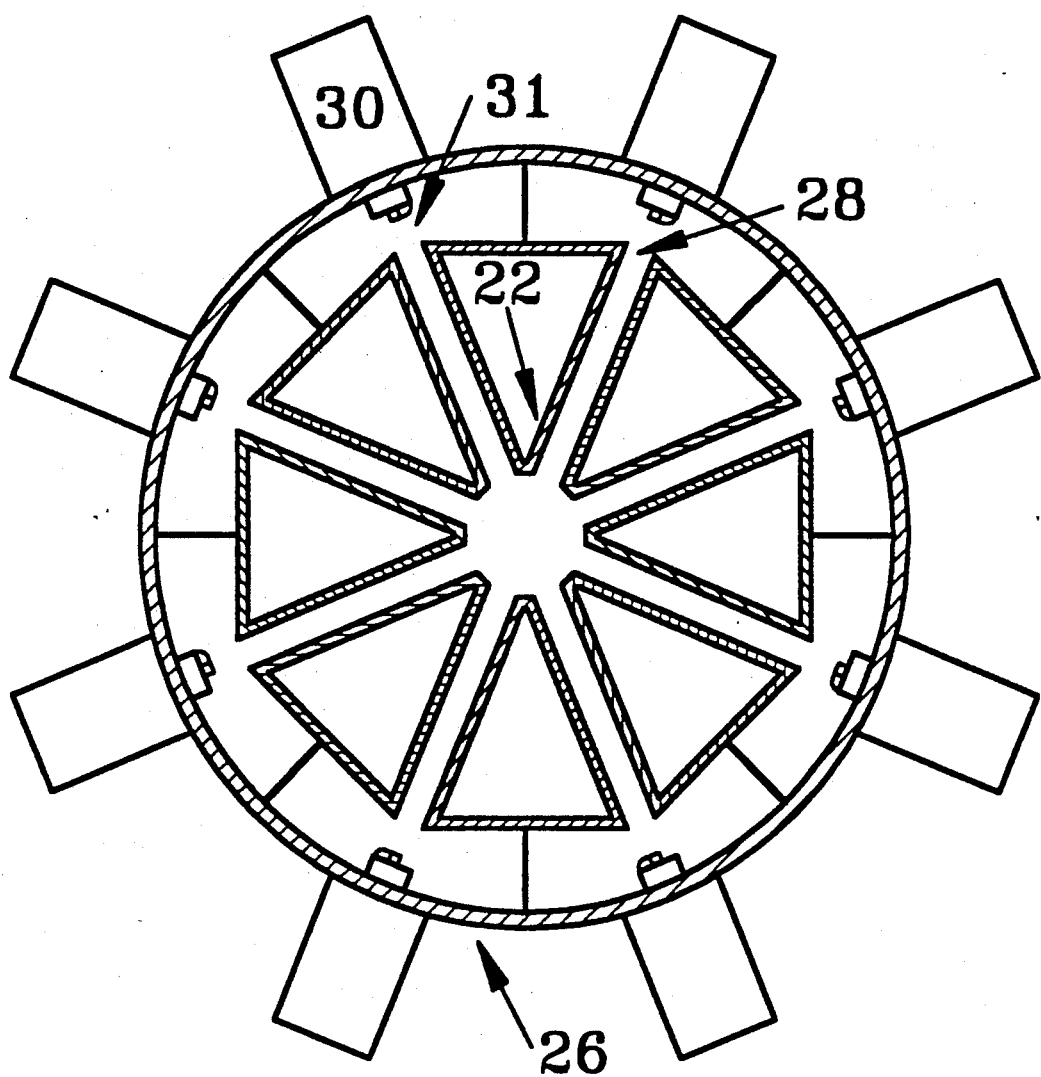
FIG. 3 is a cross-sectional schematic of a microwave excited $CO_2$ laser with radial geometry.
Figure 4:
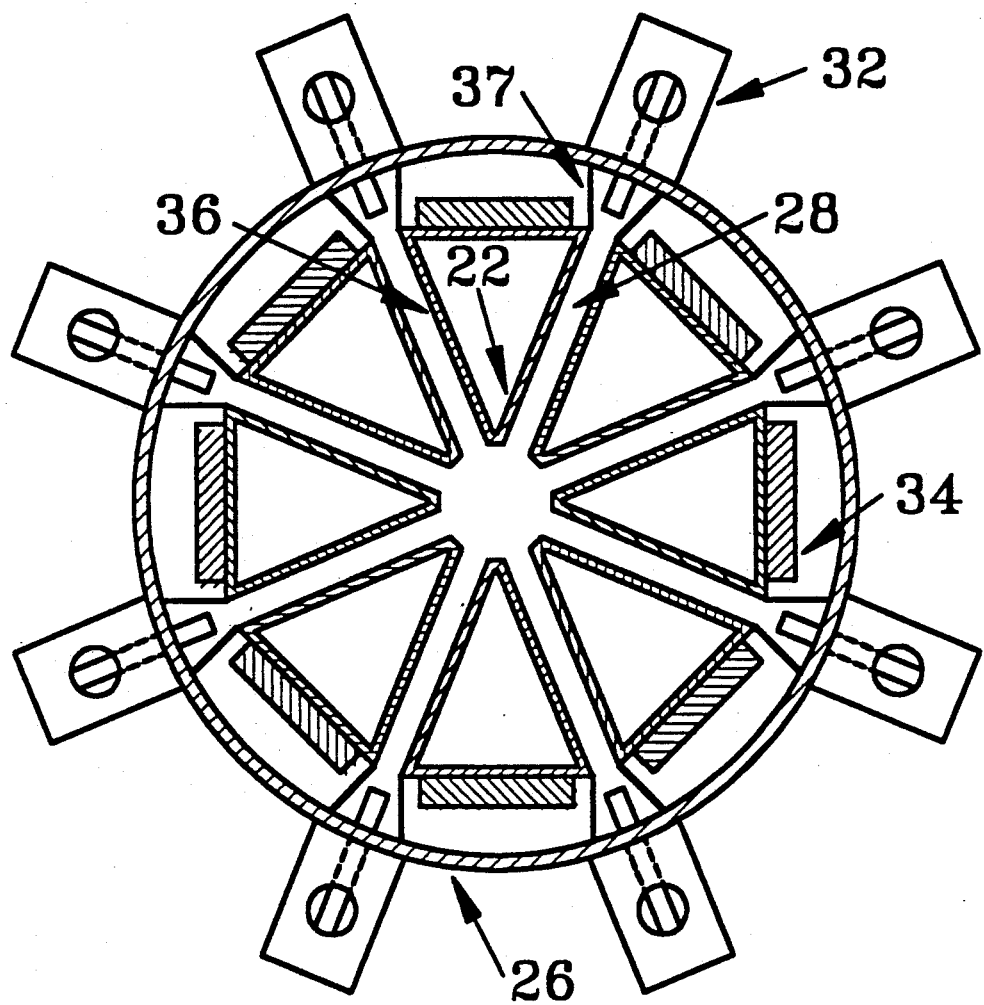
FIG. 4 is a cross-sectional schematic of a MAGPIE $CO_2$ laser with radial geometry.

Each slot gain region is driven either independently, or from a common power source. FIGS. 2 through 4 represent different gas excitation methods and corresponding excitation means for the parallel gain slot regions that may be employed. These different excitation methods, such as RF, microwaves, DC, or MAGPIE, are described in greater detail in the following sections.

Optical Resonator Configurations

Figure 5:
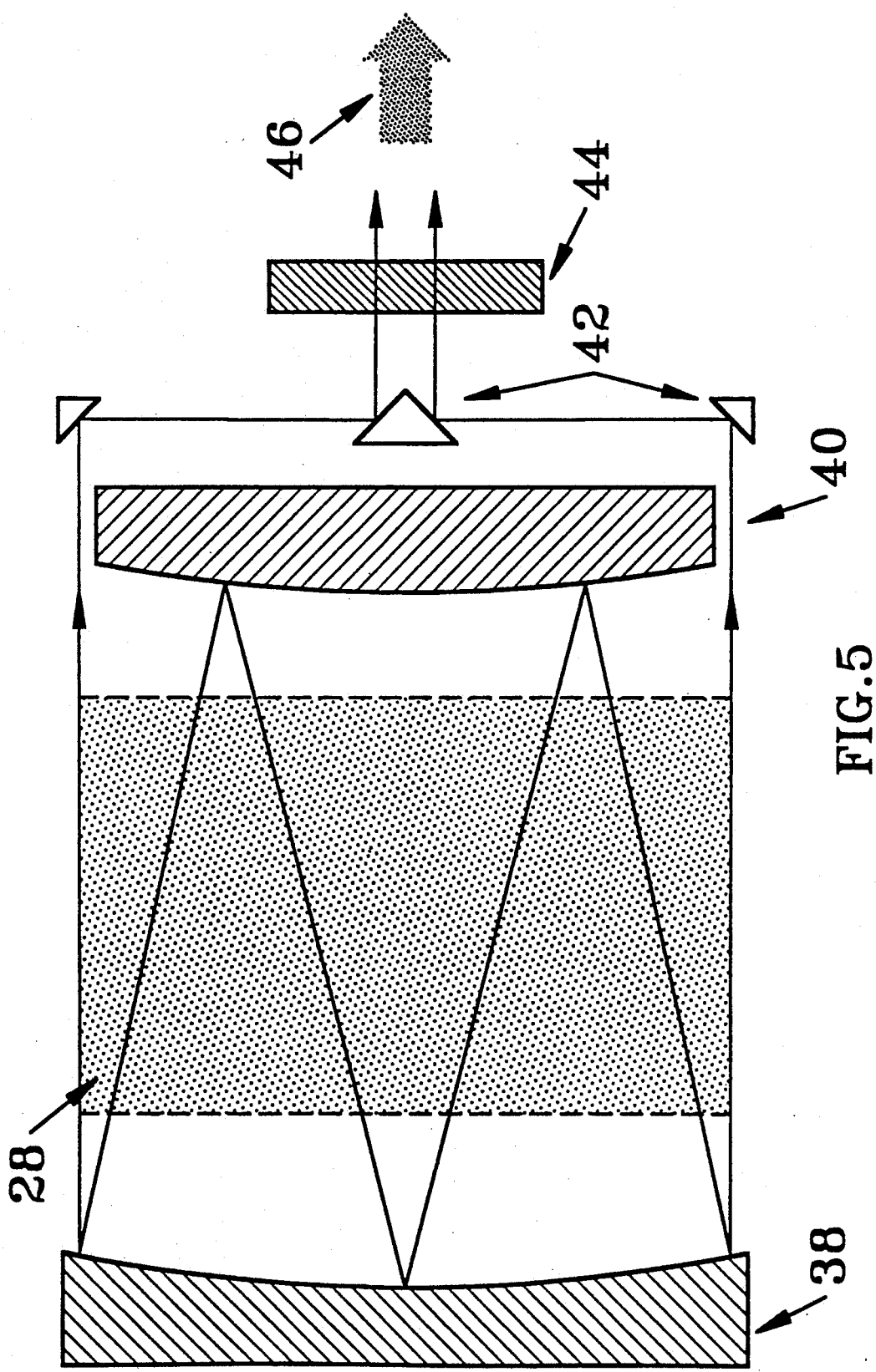
FIG. 5 is a schematic of an unstable multi-slot resonator for use with a laser having radial geometry.
Figure 6:
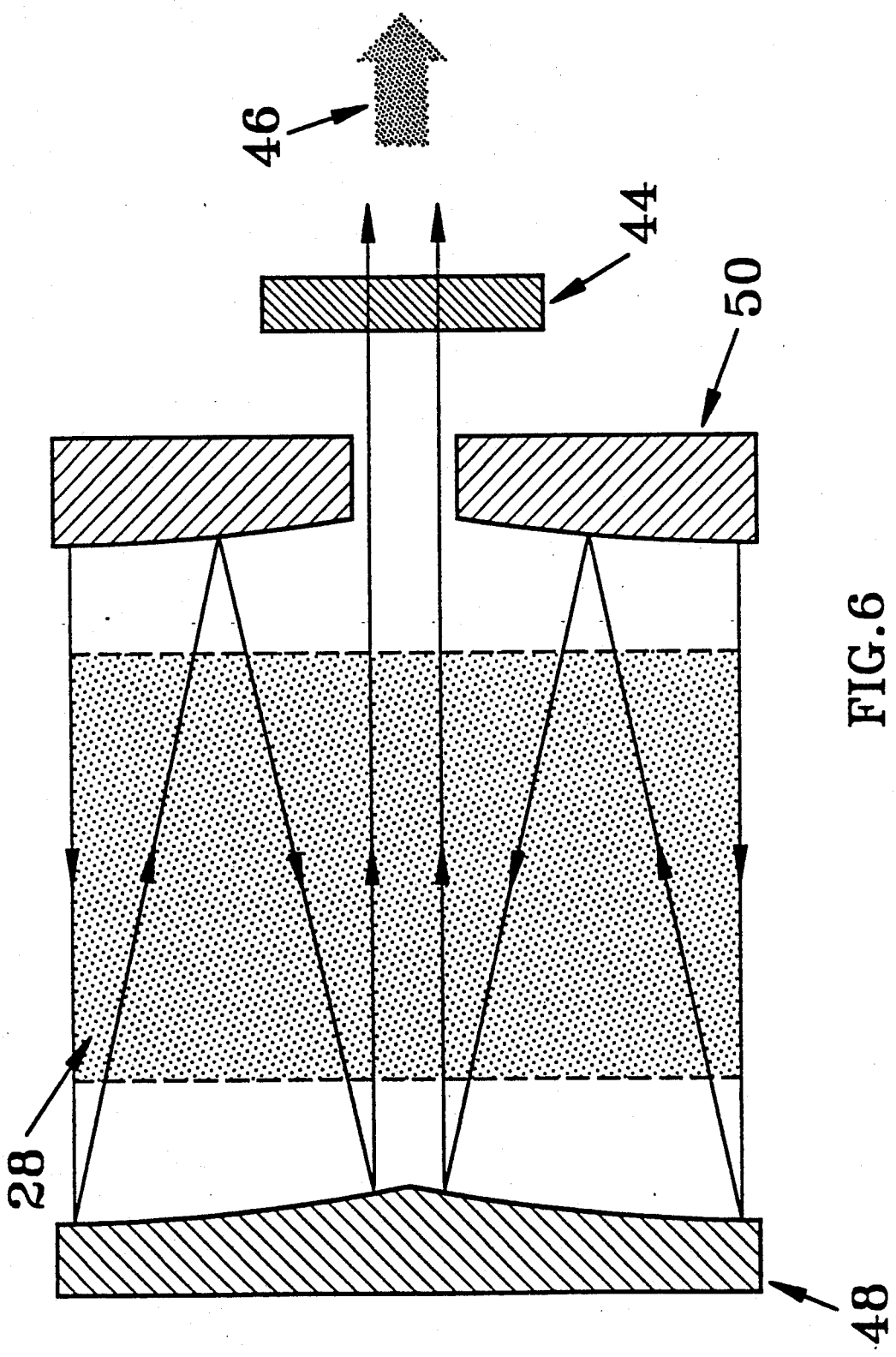
FIG. 6 is a schematic of a toric resonator for use with a laser with radial geometry.
Figure 7:
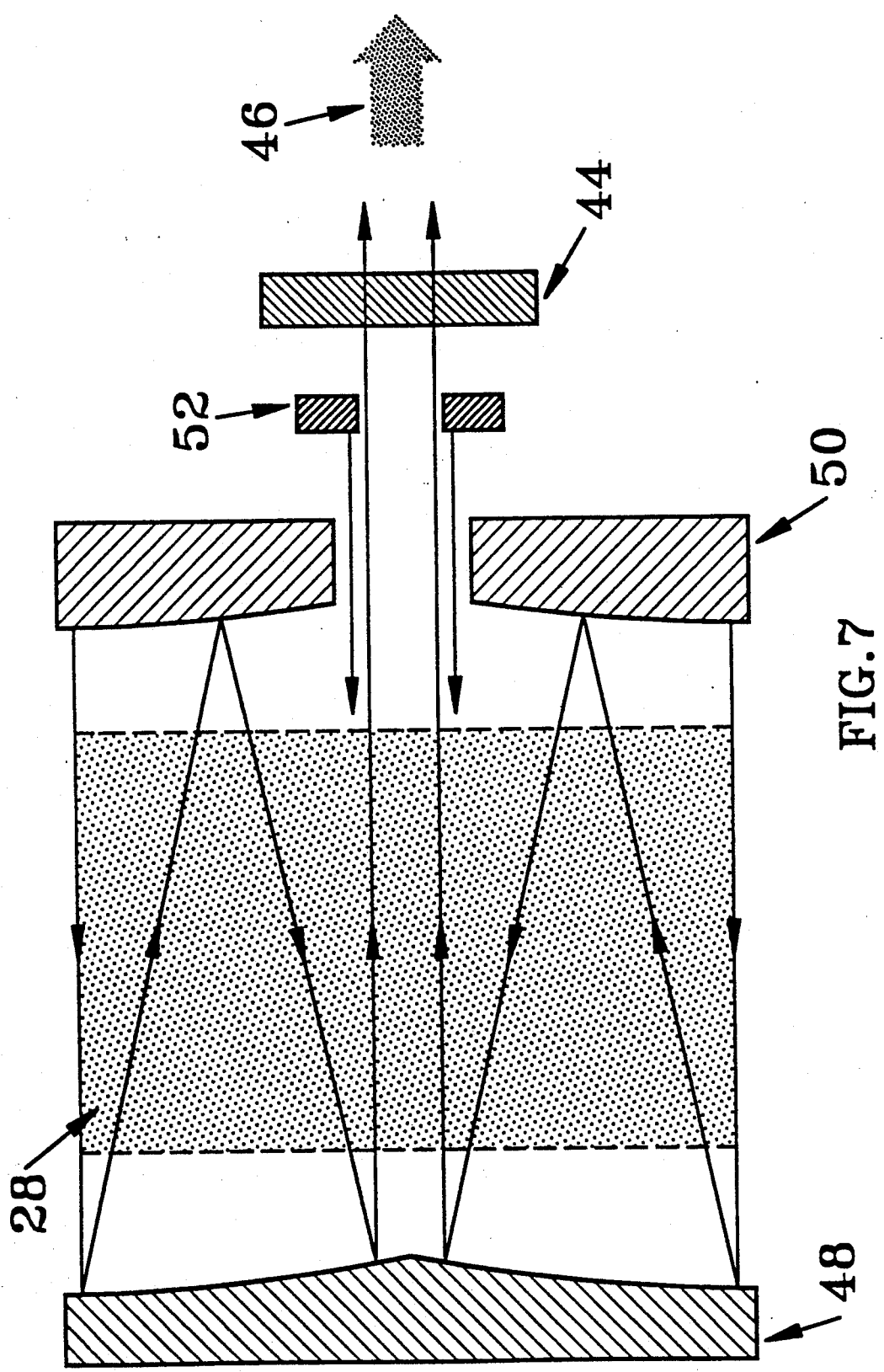
FIG. 7 is a schematic of a feedback toric resonator for use with a laser having radial geometry.

Laser energy extraction is afforded via the optical resonator configurations shown in FIGS. 5 through 7. Here it is seen that all of the parallel slot gain sections share a common unstable cavity mode. The principles of unstable resonators are described in: A. E. Segman, "Unstable Optical Resonators", Appl. Opt., Vol. 13, pp. 353-367, February 1974, all of which is incorporated herein by reference. In the geometry of FIG. 5, phase coherent, over-the-edge output coupling is achieved from each slot and compacted into a single beam via an axicon. In FIG. 5, the excited slot gain regions or discharge channels 28 are shown schematically. The discharge channels 28 are substantiallY disposed within a concave unstable resonator secondary mirror 38 and a convex unstable resonator primary mirror 40. Radiation reflecting over the edge of the mirror 40 from the mirror 38 is compacted by the axicon 42 into an output beam 46 emerging from a ZnSe output window 44. The output compacting axicon 42 is formed by an annular inclined mirror in the path of the over-the-edge output, and a cone shaped mirror placed to receive the reflected radiation from the annular mirror. Construction of these mirrors is known in the art and need not be described further here.

In the toric resonator configuration of FIG. 6 a combined but non-phase coherent laser output from each slot is obtained at the centerline. Toric resonators are described in: T. R. Ferguson, M. E. Smithers, "Toric unstable Resonators", Appl. Opt., Vol. 23, pp. 2122-2126, July, 1984, all of which is incorporated herein by reference.

As with FIG. 5, FIG. 6 shows a cross-section through a circular optical output extraction system. The discharge volume of the discharge channels 28 is shown schematically in the figure between the toric secondary mirror 48 and the toric primary mirror 50. Both mirrors are constructed in a manner known in the art. The output compacting axicon 42 used with the optical extraction system of FIG. 5 is not necessary with the toric unstable resonator designs since the output is already collimated by the design of the toric unstable resonator. The curvature of the mirrors is such that radiation traversing the discharge volume migrates towards the centre of the torus defined by the primary mirror 50. A hole in the centre of the primary mirror 50 allows the output beam to pass out through the ZnSe window to form the output beam 46.

FIG. 7 illustrates an improved version of the toric resonator, known as the retro-reflected toric unstable resonator, in which a small percentage of on-axis optical feedback is applied to impart a measure of phase coherence to the resonator mode, thereby improving the focusability of the output beam. The retro-reflected toric unstable resonator is described in: A. E. Segman, 'LASERS', 1986, Chap. 23, University Science Books, Mill Valley, Calif., all of which is herein incorporated by reference.

The optical extraction system of FIG. 7 is the same as that shown in FIG. 6 except a portion of the output beam is intercepted by an annular mirror 52 known as a feedback skimmer. This feedback skimmer intercepts a small portion of the output beam and feeds it back into the discharge volume.

Figure 8:
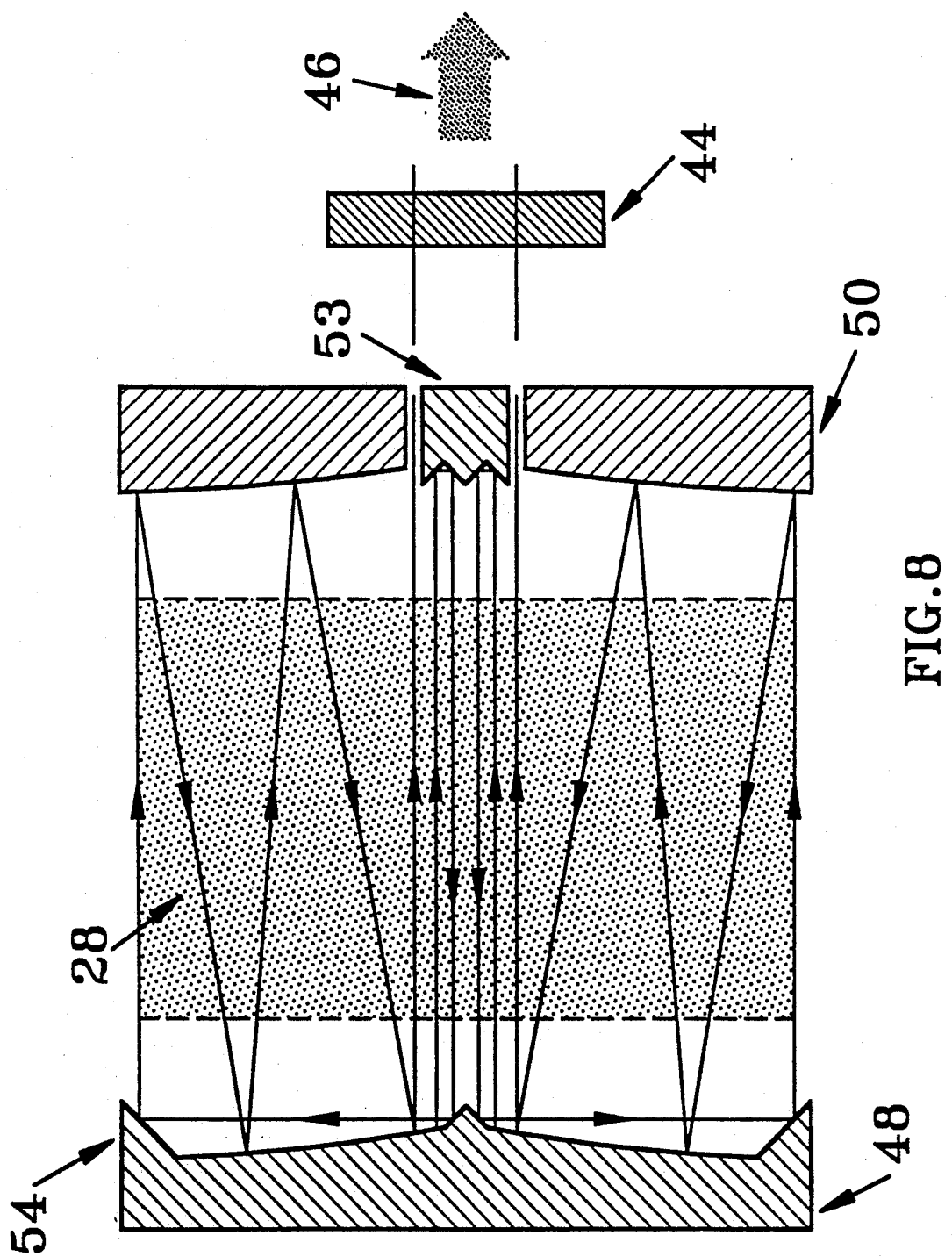
FIG. 8 is a schematic of a toric phase-locked-loop for use with a laser having radial geometry.

By providing a well defined positive feedback, phase-locked loop for the optical portion of each gain section, as depicted in FIG. 8, it is possible to achieve a fully phase coherent cavity mode, capable of delivering a very powerful beam of good optical quality. As such, an extremely small, light weight and efficient laser, in the power range up to 5 kW may be built using the approaches illustrated herein. Referring to FIG. 8, the toric unstable resonator has the same design as shown in FIGS. 6 and 7, that is, being formed by primary mirror 50 and secondary mirror 48. However, as with the feedback toric resonator design of FIG. 7, a portion of the output beam is intercepted by an annular phase locked loop feedback mirror 56. While the feedback mirror shown in FIG. 7 has a reflecting surface perpendicular to the output beam, the feedback mirror 56 in FIG. 8 is tilted in relation to the output beam so that a portion of the output beam is directed towards the inner mirror of the feedback axicon 54. From the inner annular mirror of the feedback axicon 54 the radiation is directed to the outer annular mirror and thence back into the radial discharge volume.

Excitation Methods

As indicated above, the individual gain regions or slots may be excited in a number of ways, the most important being as follows:
1. RF—(radio frequency excited)
2. MICROWAVE—(microwave magnetron excitation).
3. DC or MAGPIE—(direct current or magnetically stabilized photo-initiated, impulse-enhanced, electrically-excited).

Each of the above methods of excitation is amenable to either normal CW or Burst Mode operation, as described in my co-pending application Ser. No. 7/414,472 filed Sept. 29, 1989, the contents of which are incorporated here by reference.

Radio Frequency Excitation

In the RF excited version of FIG. 2 many parallel gain media slots 28 are created by mounting a number of RF electrodes 24 within a common hermetic chamber 26 filled with an appropriate $CO_2$ laser gas mixture, well known in the art.

In the common RF power source configuration illustrated in FIG. 1, each electrode is electrically connected to only one mounting end plate and insulated from the other by the ceramic spacer 18. Electrical connection of each alternate electrode is made to the opposite end mounting plate. One end plate is then electrically connected to the ground return side, outer-coaxial cable conductor, from a standard high frequency (typically 40 to 100 MHZ) radio frequency generator. The other end plate is connected to the RF power feed inner co-axial cable conductor. In this manner a low inductance, multiple, parallel-channel inter-digital discharge electrode system is achieved; which provides very uniform RF power deposition within the individual discharge slots.

Complete RF shielding for the laser assembly can be achieved by fabricating the outer hermetic enclosure from a good electrical conductor such as Aluminum, and using it as the co-axial return RF line for the structure. Use of electrodes alternately connected to one or the other end plate requires an even number of discharge channels. It is, however, possible to use an odd number of discharge channels, but then opposite faces of a single electrode would need to be insulated from each other (so that the electrode sequence could have the correct polarity). That is, with four discharge channels, there would be four electrodes having a total of eight faces defining the four discharge channels. Thus there would be two positive electrodes and two negative electrodes. For three discharge channels each of the three "electrodes" would have to have faces having opposite polarity so that the sequence of faces could retain the plus/minus sequence.

By maintaining a relatively small gap (typically 2 to 5 mm) between the water-cooled aluminum electrodes one can achieve effective diffusion cooling of the multiple gain volumes without the need for gas transport. Thus a compact, lightweight and extended volume RF excited laser gain media can be achieved. In the initial demonstration device the individual slots were made 50 cm. long and 3 cm. wide and with a 5 mm gap. However much longer and wider geometries can be used to increase the power available.

With the geometry shown above and under an input power loading of about 1 kW per slot the small signal gain and saturation parameters were found to be about 0.5%/cm. and 2 $kW/cm^2$ respectively. At a power loading of about 2 kW per slot the device of FIG. 1 should deliver an output optical power of between 1.5 and 2 kW per module. Four such modules connected in series would therefore provide a laser output in the 5 kW category.

Microwave Excitation

The rationale for using microwave energy to drive a $CO_2$ laser plasma stems from several aspects. Firstly, microwave magnetron power sources are much lighter and have a high 60 Hz conversion efficiency near 80%. Also highly reliable microwave magnetrons have the potential to improve the laser excitation efficiency by over 100%. An equally important consideration is the fact that microwave energy is very much less expensive than R.F. energy; typically about an order of magnitude cheaper at the industrial heating frequency of 2.45 GHz.

FIG. 3 shows a cross-sectional schematic of a microwave excited $CO_2$ laser. The excited slot gain regions 28 (also referred to as discharge channels or ridged waveguide gaps or gain media) are shown in a radial geometry about a central axis perpendicular to the figure. The ridged waveguides 29 are made, for example, of aluminum, and form the boundaries of the discharge regions 28 and the open sided ring waveguide resonator 33. Microwave excitation is provided by magnetrons 30 attached to the outer hermetic envelope 26 and having magnetron output coupling 31 disposed on the inside of the hermetic envelope 26. As is known in the art, the magnetrons are commonly available (as used for example in microwave ovens).

In past experiments featuring gigahertz frequency excitation of a $CO_2$ laser mixture, the microwave technique and apparatus utilized were not conducive to an optimization of the laser's geometry. Also past approaches were not convenient or sufficiently compact for scaling into the multikilowatt regime of optical power extraction. These aspects of the technology, of particular importance in robotic or space applications, have been addressed through adoption of a unique ridged-waveguide travelling-wave structure depicted in FIGS. 9 and 10.

Travelling Wave Resonator Geometry

In order to negate the problems of non-uniform excitation along the laser's active length caused by creation of microwave standing waves in the laser discharge channel, a problem often encountered in R.F. excited lasers and in previous attempts using microwave excitation, a microwave ring-resonator geometry has been selected. The basic concept illustrated schematically in FIG. 9 employs a continuous double ridged aluminum waveguide 58 to act both as the microwave energy conduit as well as the laser's excitation system and gas envelop. Propagation modes of microwave energy and construction of double ridged aluminum waveguides are known in the art and need not be described here.

The utilization of a double ridged-waveguide structure is a particularly important concept, since the ridged geometry confines nearly 100% of the travelling microwave energy into the narrow volume defined by the double-ridge gap. The travelling waveguide microwave resonator also prevents non-uniform excitation of the laser gas volume due to standing waves or microwave field attenuation, as has been experienced using other approaches.

Consequently, a very high mode filling factor can be achieved, since both the laser plasma and the optical cavity are well defined and constrained to exist only within this narrow gap region 68. Such a condition also allows for effective heat transfer to the water-cooled metallic guide walls, thereby providing for a concomitant increase in the laser's operational efficiency.

In this manner, a light weight and compact structure is obtained, which provides for complete utilization of all the microwave power generated. In this concept, the microwave energy is channelled into the laser plasma by having magnetrons 30 coupled directly into the wall 31 of the ridged waveguide structure, which serves as both ring microwave resonator and laser chamber.

Figure 9:
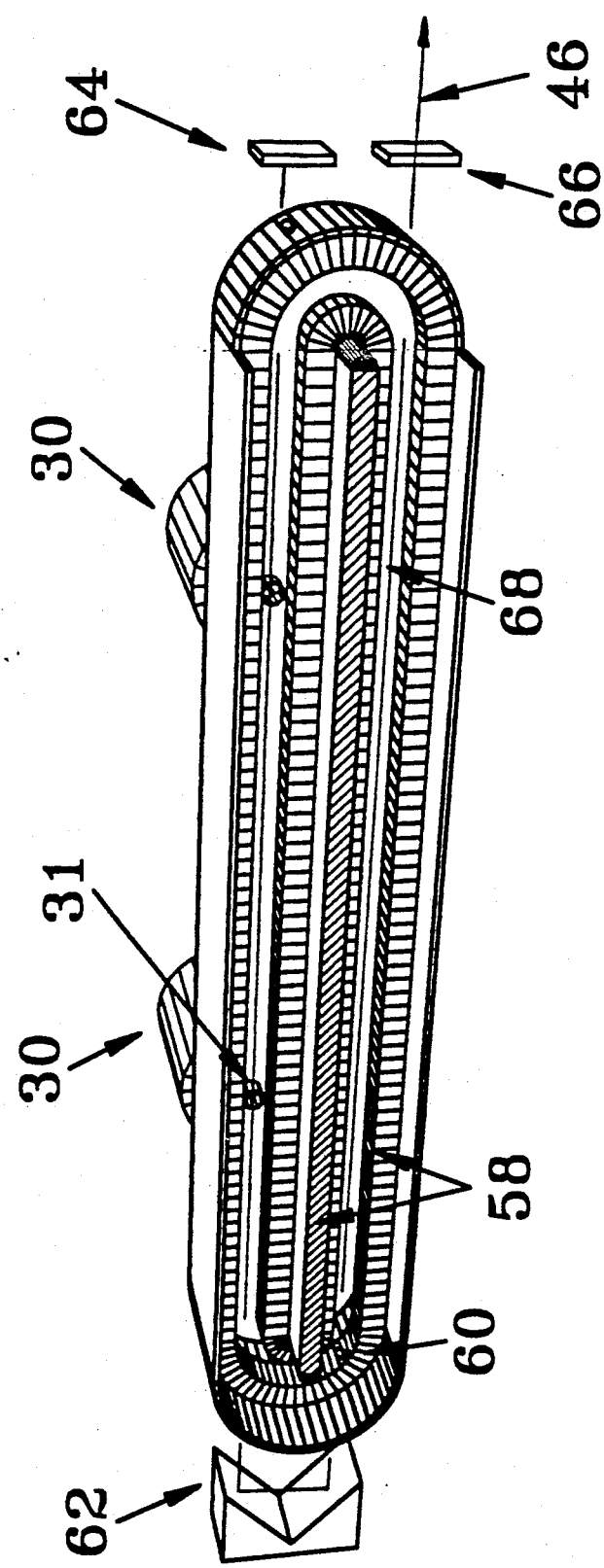
FIG. 9 is a perspective, partially cut away, of a microwave excited $CO_2$ laser showing in particular a ridged waveguide ring resonator geometry.

To increase the average power level of the machine, it is desirable to couple additional magnetrons 30 into the side wall of the waveguide, in a linear phased array or directional travelling wave manner. The ring microwave resonator also provides a convenient double-pass gain media for optical energy extraction as depicted in FIG. 9, through utilization of an optical folding prism 62 with cavity mirrors 64 and 66. Holes (not shown) in the ridges allow the laser energy to escape the double-ridged waveguide.

One may also use a magnetic field to stabilize the plasma in the microwave excited ridged waveguide structure of FIG. 9 by placing a row of small permanent magnets down either side of each waveguide ridge. This feature, known as magnetic stabilization, permits an even more uniform and increased discharge power loading into the travelling wave structure, through the LORENTZ $J \times B$ interaction.

Radial Microwave Geometry

Figure 10:
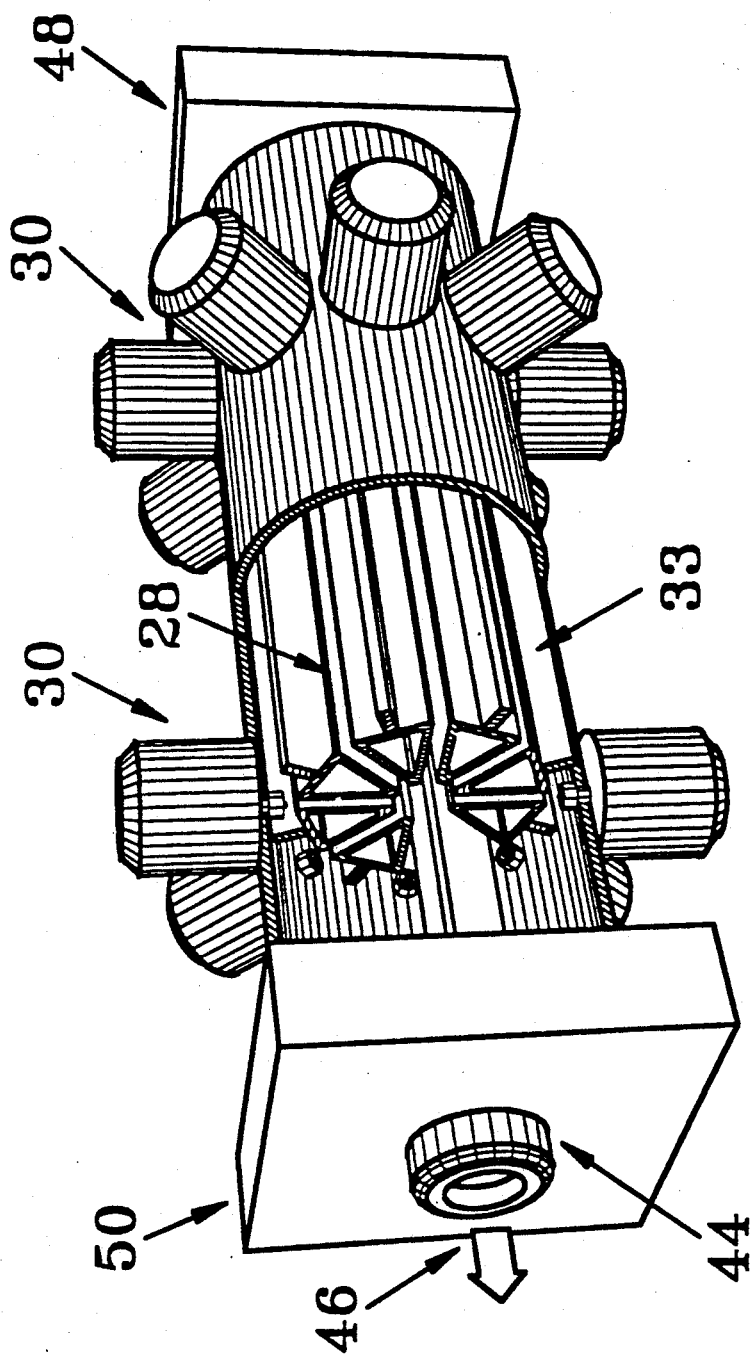
FIG. 10 shows a perspective, partially cut away, of a microwave excited laser having a ridged waveguide structure and radial geometry.

To extend the extractable laser power well into the multikilowatt range, the microwave laser geometry shown in FIG. 10 is utilized. In essence the unit is very similar to the construction of FIG. 1, being comprised of a number of parallel open-sided, water cooled, microwave ring resonator structures 33 built into a radial or Zodiac pattern. Each slot 28 again contributes to a ridged waveguide travelling wave, which now encompasses the series microwave path lengths of all the slots Since the path length in paired slots 28 should be equal transversely across each ridged waveguide, the end of the waveguides 33 should be flared at each end (not shown) to give equal path length for microwaves travelling in the waveguide.

As in the case of the RF excited Zodiac geometry, each gain slot of this microwave excited system shares a common optical mode of an unstable resonator, as illustrated previously in FIGS. 5 through 7. Thus, resonator mirrors 48 and 50 constituting retro and output optical systems are also constructed as shown in FIGS. 5, 6 and 7.

Magpie Excitation

The PIE excitation and magnetic stabilization approaches can be utilized either singly or in combination, to provide an efficient method for laser plasma excitation, and may be effectively used to provide a high power MAGPIE ZODIAC $CO_2$ laser, as illustrated in FIG. 4.

In FIG. 4, fluid ballasted multi-element electrodes 32 are arranged in alternate polarity linear arrays fitted through the wall of a hermetic gas envelope 26. The multiple discharge channels 28 are arranged in a radial or Zodiac configuration. A line of permanent magnets 34 capable of producing a magnetic field strength of several hundred gauss across the end of the fluid ballasted pin electrodes 32 are arranged between the discharge channels 28.

Water-cooled heat exchangers 22 serve both to define the gain media and to provide diffusion cooling of the laser plasma within these discharge slots. A high temperature, thermally conducting, but electrically insulating coating 36 is used to completely encapsulate the heat exchangers 22, and inside of the hermetic enclosure 26, to prevent shorting-out of the discharge slots.

In operation, the repetitive, high frequency application of sequential photoionization and impulse avalanching processes to the fluid-ballasted, multi-element electrodes are used to generate uniform ionization of the gas media gain within the slots. Main vibrational pumping is accomplished independently of plasma ionization, through a non-selfsustained DC field impressed across the hollow cathode pin tips 37. This sequence of events constitutes the basic PIE excitation process, as described in, H. J. J.. Seguin, et. al., "The Photo-initiated, Impulse-enhanced, Electrically-excited (PIE) Discharge for High Power CW Laser Applications", Appl. Phys. Letts. Vol. 32, pp. 418–420, 1978, all of which is incorporated herein by reference.

In this manner the best E/N ratio within the discharge regions can be maintained, so as to provide optimization of the laser's excitation efficiency. The permanent magnets labelled 34 are included in the design to give enhanced discharge stability and uniformity, via the influence of induced J×B Lorentz forces upon the electron and ion sheaths at the pin electrode surfaces. Further description of the MAGPIE excitation is found in:

A. K. Nath, H. J. J. Seguin, et. al., "Optimization Studies of a Multikilowatt PIE $CO_2$ Laser", IEEE J. Quantum. Electron. Vol. QE-22, pp. 268, 1986;

S. K. Nikumb, H. J. J. Seguin, et. al., "Burst-mode Gain Switched Technique for High Peak and Average Power Optical Energy Extraction", Appl. Opts. Vol. 28, pp. 1624–1627, May, 1989;

H. J. J. Seguin, C. E. Capjack, et. al, "High Power Laser Discharge Stabilization With Magnetic Fields", Appl. Phys. Lett. Vol. 37, pp. 130–133, 1980;

C. E. Capjack, H. J. J. Seguin, et., al., "A Magnetically Stabilized Coaxial Laser Discharge", Appl. Phys. B. Vol. 26, pp. 203–205, 1981;

H. J. J. Seguin, et. al., U.S. Pat. No. 4,604,752, Canadian Patent No. 1,189,604;

V. A. Seguin, H. J. J. Seguin, et. al., "Electrical Characteristics of a MAGPIE Coaxial Laser Discharge System", J. Appl. Phys. Vol. 57, pp. 4954–4961, 1985; and W. L. Nighan, "Electron Energy Distributions and Collision Rates in Excited N2,CO2 and CO, Phys. Rev.A, Vol. 2., pp. 1989-2000, November 1970, all of which are incorporated herein in their entirety by reference.

As in the two previous cases of RF and Microwave excitation, the MAGPIE Zodiac laser geometry can employ any of the optical extraction resonator systems illustrated in FIGS. 5 through 7.

I claim:

1. A laser system comprising:
   plural pairs of parallel electrode faces, each pair of parallel electrode faces defining a narrow-gap discharge channel;
   the pairs of parallel electrode faces being arranged about and extending radially from a first common central axis;
   means attached to the electrode faces for diffusion cooling the electrode faces;
   means attached to the electrode faces for providing laser excitation energy to the electrode faces, whereby application of the laser excitation energy to the electrode faces generates a laser plasma in the discharge channels; and
   optical extracting means having a second central axis coinciding with the first common central axis and being disposed about the pairs of parallel electrode faces for generating a common resonator mode for all of the discharge channels and for extracting the laser energy from all of the discharge channels simultaneously.

2. The laser system of claim 1 in which the means for extracting the laser energy includes an optical resonator having a common unstable cavity mode and an annular output, and further including an output compacting axicon mounted to receiving the annular output.

3. The laser system of claim 1 in which the discharge channels are mounted in a toric resonator.

4. The laser system of claim 1 in which the discharge channels are mounted in a retro-reflective toric unstable resonator.

5. The laser system of claim 4 further including means mounted in the output from the laser system for feeding back a portion of the output into the discharge channels.

6. The laser system of claim 1 in which at least one pair of adjacent discharge channels is coupled to form a ring microwave resonator.

7. The laser system of claim 6 in which the at least one pair of adjacent channels is formed by a continuous double ridged waveguide.

8. The laser system of claim 6 in which the means for providing laser excitation to the discharge channels includes a plurality of microwave generators.

9. The laser system of claim 7 in which the means for providing laser excitation to the discharge channels is a plurality of microwave generators 10. The laser system of claim 1 in which each pair of parallel electrodes consists of a first electrode and a second opposing electrode and the laser system has a first end and a second end and further comprising:
    a first electrode plate at the first end of the laser system;
    a second electrode plate at the second end of the laser system; and
    each of the first electrodes being connected to one of the first and second electrode plates and each of the second electrodes being connected to the other of the first and second electrode plates.

11. The laser system of claim 1 in which each pair of parallel electrode faces consists of a first electrode face from a first electrode and a second electrode face rom a second electrode, each of the first and second electrodes being triangular in cross-section.

12. The laser system of claim 1 in which the number of plural pairs of parallel electrode faces in an even number and each triangular electrode defines the electrode faces for two adjacent discharge channels, one on each side of the triangular electrode.

13. A laser system comprising:
    three or more pairs of parallel electrode faces, each pair of parallel electrode faces defining a narrow-gap discharge channel;
    the pairs of parallel electrode faces being arranged about and extending radially from a first common central axis;
    means attached to the electrode faces for cooling the electrode faces;
    means attached to the electrode faces for providing laser excitation energy to the electrode faces, whereby application of the laser excitation energy to the electrode faces generates a laser plasma in the discharge channels;

optical extracting means having a second central axis coinciding with the first common central axis and being disposed about the pairs of parallel electrode faces for generating a common resonator mode for all of the discharge channels and for extracting the laser energy from all of the discharge channels simultaneously;

each pair of parallel electrode faces consisting of a first electrode face from a first electrode and a second electrode face from a second opposing electrode, each of the first and second electrodes being triangular in cross-section;

the number of pairs of parallel electrode faces being an even number and each triangular electrode defining the electrode faces for two adjacent discharge channels, one on each side of the triangular electrode;

the laser system having first and second ends, and a first electrode plate at the first end and a second electrode plate at the second end; and each of the first electrodes being connected to one of the first and second electrode plates and each of the second electrodes being connected to the other of the first and second electrode plates.

14. A laser system comprising:

a first continuous ridged electrode defining a first ridge and forming a first ring, the first ridge being formed on the inside of the first ring;

a second continuous ridged electrode defining a second ridge and forming a second ring inside the first ring, the second ridge opposing the first ridge;

the first and second ridges defining a narrow-gap discharge channel between them and the first and second electrodes thereby forming a continuous double ridged waveguide;

means connected to the first and second electrodes for pumping microwave laser excitation energy into the discharge channel and for generating a laser plasma in the discharge channel; and optical extraction means for extracting laser optical energy from the narrow-gap discharge channel.

15. The laser system of claim 14 in which the electrodes are metallic and diffusion cooled.

* * * * *